United States Patent
Hirano

(10) Patent No.: US 9,330,447 B2
(45) Date of Patent: May 3, 2016

(54) IMAGE EVALUATION DEVICE, IMAGE SELECTION DEVICE, IMAGE EVALUATION METHOD, RECORDING MEDIUM, AND PROGRAM

(71) Applicant: Hiromi Hirano, Shinagawa-ku (JP)

(72) Inventor: Hiromi Hirano, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 175 days.

(21) Appl. No.: 14/356,039

(22) PCT Filed: Nov. 15, 2012

(86) PCT No.: PCT/JP2012/079702
§ 371 (c)(1),
(2) Date: May 2, 2014

(87) PCT Pub. No.: WO2013/161111
PCT Pub. Date: Oct. 31, 2013

(65) Prior Publication Data
US 2014/0301640 A1 Oct. 9, 2014

(30) Foreign Application Priority Data
Apr. 25, 2012 (JP) .................................. 2012-100211

(51) Int. Cl.
*G06K 9/00* (2006.01)
*G06T 7/00* (2006.01)
*G06T 5/00* (2006.01)

(52) U.S. Cl.
CPC .............. *G06T 7/0002* (2013.01); *G06T 5/002* (2013.01); *G06T 2207/10024* (2013.01); *G06T 2207/20224* (2013.01); *G06T 2207/30168* (2013.01)

(58) Field of Classification Search
CPC ....................... G06T 2207/30168; G06T 5/002
See application file for complete search history.

(56) References Cited

U.S. PATENT DOCUMENTS 8,184,924 B2* 5/2012 Tsuruoka ............. H04N 1/4072
348/207.99
2008/0292194 A1* 11/2008 Schmidt ................ G06T 7/0012
382/217

(Continued)

FOREIGN PATENT DOCUMENTS

JP 10-200893 A 7/1998

OTHER PUBLICATIONS

D. Y. Tsai, Y. Lee, and E. Matsuyama, "Information entropy measure for evaluation of image quality", J. Digit. Imaging, vol. 21, vol. 3, pp. 338-347, 2008.*

(Continued)

*Primary Examiner* — Bhavesh Mehta
*Assistant Examiner* — Ian Lemieux
(74) *Attorney, Agent, or Firm* — Sughrue Mion, PLLC

(57) ABSTRACT

An image evaluation device (101) properly evaluating the graininess (or roughness) of an image is provided. The blurer (102) creates a second image b by blurring a first image a. The differentiator (103) creates a third image c presenting the difference between the first image a and second image b. The pixel value of each pixel of the third image c presents the difference in pixel value between the pixels at the same position in the first image a and second image b. The scanner (104) scans the pixels contained in the third image c, obtains the differences in pixel value between adjoining pixels, and obtains the respective probabilities of occurrence of the differences. The calculator (105) calculates the entropy from the obtained, respective probabilities of occurrence of the differences. The outputter (106) outputs the entropy as the evaluation value of the graininess (or roughness) of the first image.

8 Claims, 13 Drawing Sheets

(56) References Cited

U.S. PATENT DOCUMENTS

2010/0232671 A1* 9/2010 Dam .................. G06K 9/623
 382/132
2014/0355904 A1* 12/2014 Olsson .................. G06T 5/004
 382/263

OTHER PUBLICATIONS

J. R. Mathiassen, A. Skavhaug, and K. Bo, "Texture Similarity Measure Using Kullback-Leibler Divergence between Gamma Distributions", Computer Vision—ECCV 2002, 7th European Conference on Computer Vision, Copenhagen, Denmark, May 28-31, 2002.*

Jian Zhang et al., "A Pseudo-hilbert Scan Algorithm for Arbitrarily-Sized Rectangle Region", Advances in Machine Vision, Image Processing, and Pattern Analysis, Lecture Notes in Computer Science, pp. 290-299, vol. 4153/2006.

International Search Report for PCT/JP2012/079702 dated Dec. 18, 2012.

* cited by examiner

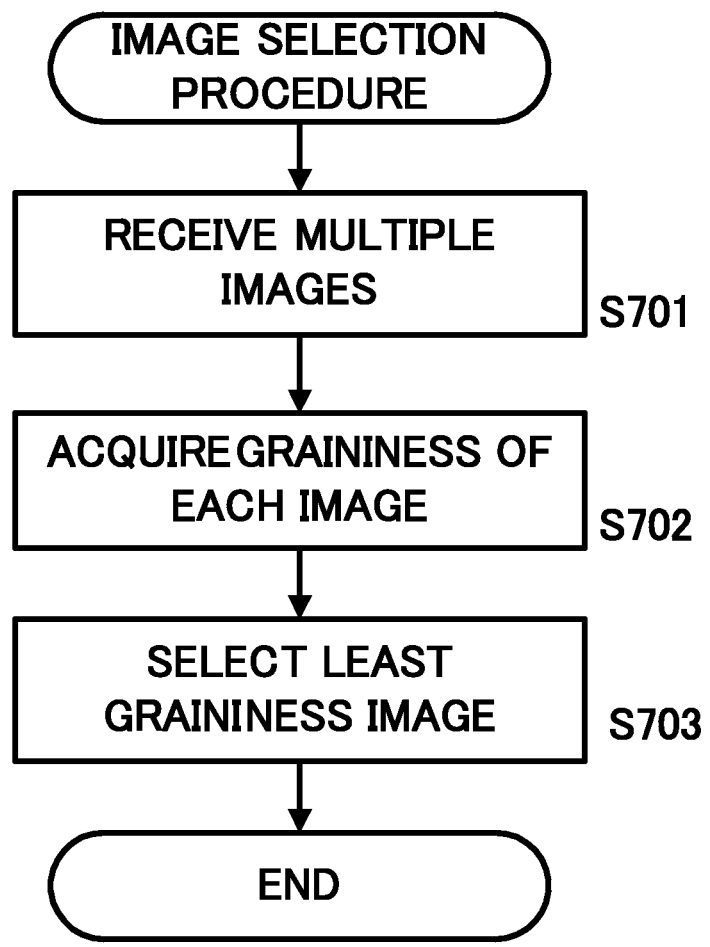

IMAGE EVALUATION DEVICE, IMAGE SELECTION DEVICE, IMAGE EVALUATION METHOD, RECORDING MEDIUM, AND PROGRAM

CROSS REFERENCE TO RELATED APPLICATIONS

This application is a National Stage of International Application No. PCT/JP2012/079702 filed Nov. 15, 2012, claiming priority based on Japanese Patent Application No. 2012-100211 filed Apr. 25, 2012, the contents of all of which are incorporated herein by reference in their entirety.

TECHNICAL FIELD

The present invention relates to an image evaluation device, image selection device, image evaluation method, recording medium, and program for properly evaluating the graininess (or roughness) of an image.

BACKGROUND ART

Techniques for evaluating an image have been proposed in the prior art. For example, Patent Literature 1 proposes a technique of objectively evaluating an evaluation-target image resulting from processing an original image using entropy. This technique necessitates the un-processed original image as a comparing image in addition to the evaluation-target image.

Additionally, Non Patent Literature 1 reports a study on pseudo-Hilbert scan satisfying the condition that neighboring pixels on a path are also neighbors in a rectangular image while going through all pixels of the rectangular image for making progress in applications in image compression.

CITATION LIST

Patent Literature

Patent Literature 1: Unexamined Japanese Patent Application Kokai Publication No. H10-200893.

Non Patent Literature

Non Patent Literature 1: Jian Zhang, Sei-ichiro Kamata and Yoshifumi Ueshige, A Pseudo-Hilbert Scan Algorithm for Arbitrarily-Sized Rectangle Region, ADVANCES IN MACHINE VISION, IMAGE PROCESSING, AND PATTERN ANALYSIS, Lecture Notes in Computer Science, Volume 4153/2006, 290-299, DOI: 10, 1007/11821045_31, 2006.

SUMMARY OF INVENTION

Technical Problem

However, there is a strong demand for objectively evaluating an evaluation-target image by referring only to the evaluation-target image without comparing with any other comparable image separately prepared.

Furthermore, there is also a demand for finding the graininess of an image without caring for the size of the image in the above evaluation.

The present invention solves the above problems and an exemplary objective of the present invention is to provide an image evaluation device, image selection device, image evaluation method, recording medium, and program for properly evaluating the graininess (or roughness) of an image.

Solution to Problem

The image evaluation device according to a first exemplary aspect of the present invention comprises:
a blurer creating a second image by blurring a first image;
a differentiator creating a third image presenting a difference in pixel value of each pixel between the first image and the second image;
a scanner scanning pixels contained in the third image, obtaining differences in pixel value between adjoining pixels, and obtaining respective probabilities of occurrence of the obtained differences;
a calculator calculating an entropy from the respective probabilities of occurrence of the obtained differences; and
an outputter outputting the entropy as an evaluation value of a graininess of the first image.

Furthermore, in the image evaluation device of the present invention,
the scanner can scan the pixels contained in the third image from left to right and from top to bottom.

Furthermore, in the image evaluation device of the present invention,
the scanner can scan the pixels contained in the third image along a space-filling curve.

Furthermore, in the image evaluation device of the present invention,
a pixel value of each pixel contained in the third image is a distance between a pixel value at a position of that pixel in the first image and a pixel value at a position of that pixel in the second image in a given color space.

Furthermore, in the image evaluation device of the present invention,
the difference in pixel value between the adjoining pixels can be a distance between the pixel values of the adjoining pixels in a given color space.

The image selection device according to a second exemplary aspect of the present invention comprises:
a receiver receiving multiple images depicting an object;
an acquirer acquiring an evaluation value of a graininess of each of the multiple received images from the above-described image evaluation; and
a selector selecting the least rough image from the multiple received images based on the acquired graininess evaluation values.

The image evaluation method according to a third exemplary aspect of the present invention is executed by an image evaluation device comprising a blurer, a differentiator, a scanner, a calculator, and an outputter, and comprises:
a blurring step in which the blurer creates a second image by blurring a first image;
a differentiation step in which the differentiator creates a third image presenting a difference in pixel value of each pixel between the first image and the second image;
a scanning step in which the scanner scans pixels contained in the third image, obtains the differences in pixel value between adjoining pixels, and obtains respective probabilities of occurrence of the obtained differences;
a calculation step in which the calculator calculates an entropy from the respective probabilities of occurrence of the obtained differences; and
an output step in which the outputter outputs the entropy as an evaluation value of a graininess of the first image.

The computer-readable recording medium according to a fourth exemplary aspect of the present invention records a program that allows a computer to function as:

a blurer creating a second image by blurring a first image;

a differentiator creating a third image presenting a difference in pixel value of each pixel between the first image and the second image;

a scanner scanning pixels contained in the third image, obtaining the differences in pixel value between adjoining pixels, and obtaining respective probabilities of occurrence of the obtained differences;

a calculator calculating an entropy from the respective probabilities of occurrence of the obtained differences; and an outputter outputting the entropy as an evaluation value of a graininess of the first image.

The program according to a fifth exemplary aspect of the present invention allows a computer to function as:

a blurer creating a second image by blurring a first image;

a differentiator creating a third image presenting a difference in pixel value of each pixel between the first image and the second image;

a scanner scanning the pixels contained in the third image, obtaining the differences in pixel value between adjoining pixels, and obtaining the respective probabilities of occurrence of the obtained differences;

a calculator calculating an entropy from the respective probabilities of occurrence of the obtained differences; and an outputter outputting the entropy as an evaluation value of the graininess of the first image.

The program of the present invention can be recorded on a non-transitory computer-readable recording medium such as a compact disc, flexible disc, hard disc, magneto optical disc, digital video disc, magnetic tape, and semiconductor memory. Furthermore, such a recording medium can be distributed/sold independently from the computer.

Furthermore, the program of the present invention can be loaded and temporarily recorded on a computer-readable recording medium such as a RAM (random access memory) from the above recording medium and then the CPU (central processing unit) can read, interpret, and execute the program recorded on the RAM.

Furthermore, the program of the present invention can be distributed/sold via a transitory transfer medium such as a computer communication network independently from the computer on which the program runs.

Advantageous Effects of Invention

The present invention can provide an image evaluation device, image selection device, image evaluation method, recording medium, and program for properly evaluating the graininess (or roughness) of an image.

BRIEF DESCRIPTION OF DRAWINGS

FIG. 8 is a flowchart showing the process flow of the image selection method executed by the image selection device.

DESCRIPTION OF EMBODIMENTS

Figure 1A:
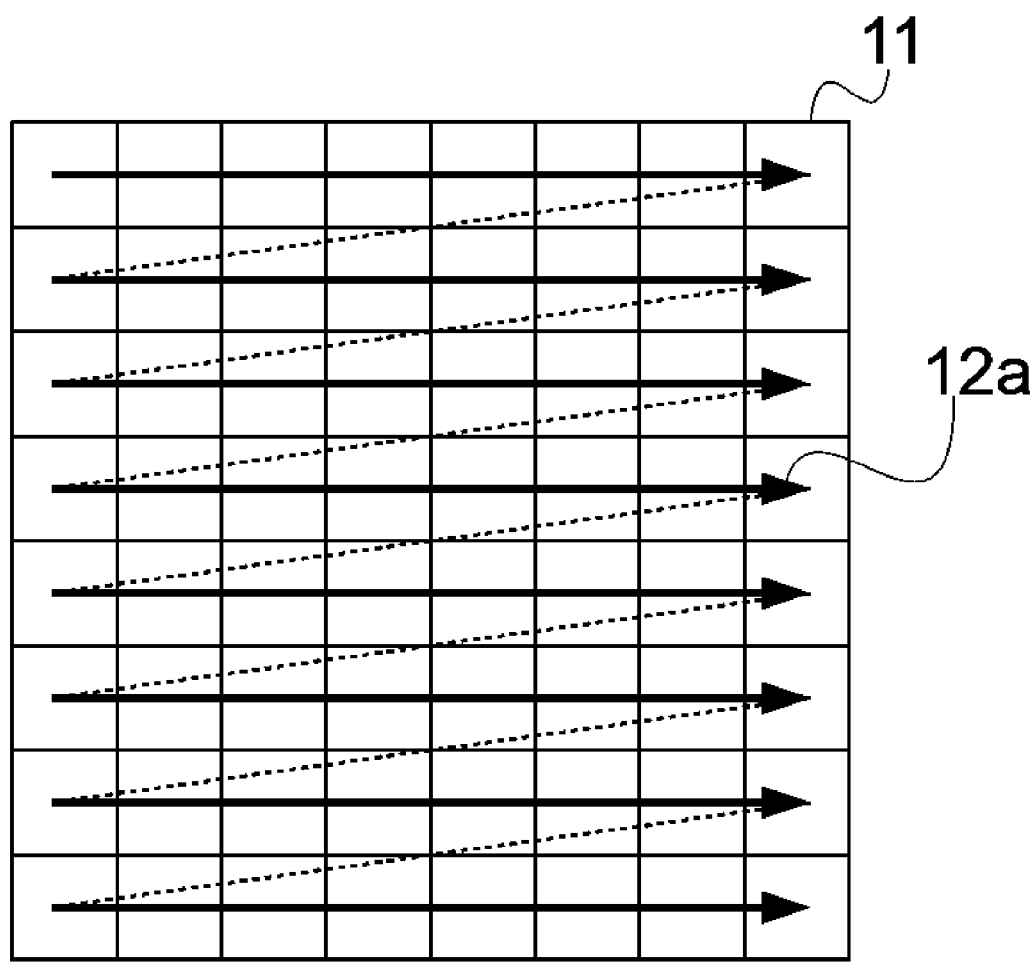
FIG. 1A is an explanatory illustration for explaining an image-scanning path.

Embodiments of the present invention will be described hereafter. The embodiments are given for the purpose of explanation and do not confine the scope of the invention of the present application. Therefore, a person of ordinary skill in the field may embrace an embodiment in which some or all components are replaced with equivalent counterparts and such an embodiment falls under the scope of the present invention.

Embodiment 1

The image evaluation device according to the present invention can be realized by running given programs on various kinds of computers such as server computers and personal computers.

Here, a computer means a piece of hardware on which a CPU runs programs so as to use a RAM as a temporary storage area and/or output destination of the processing results, receive instruction from a user through an input device such as a keyboard and mouse, output the processing results to an output device such as a display, and communicate with other devices via an NIC (network interface card) for the above input/output, and the input/output devices can be omitted as appropriate.

The hard disc or the like of a computer records images to be processed by the CPU in addition to the programs to be run by the CPU. In many cases, the images are managed by means of a file system and various databases along with information regarding the photographer, shooting date/time, shooting location, and shooting object.

Here, it is possible that multiple computers connected via computer communication networks including the Internet execute the above processing in a parallel, distributed, or concurrent manner so as to expedite the processing of the image evaluation device according to the present invention.

Additionally, the image evaluation device of the present invention can be realized by applying FPGA (field programmable gate array) techniques or the like to design an electronic circuit base on the programs and configure a dedicated electronic circuit.

(Evaluation-Target Image)

This embodiment evaluates the graininess (or roughness) of an image. The evaluation-target image is a digitally-processable image obtained by photographing a real object with a digital camera or by scanning a film or sheet of paper with a scanner.

In the following explanation, an image a has a rectangular shape having a width of a.W dots and a length of a.H dots and is expressed by a set of a.W×a.H pixels for easier understanding. Starting from the top left one, the positions of the pixels are referred to as follows. In other words, the first element of coordinates presenting a pixel position is defined on the horizontal axis in the left-to-right direction and the second element thereof is defined on the vertical axis in the top-to-bottom direction.

(0, 0), (1, 0), (2, 0), . . . , (a.W−1, 0),
(0, 1), (1, 1), (2, 1), . . . , (a.W−1, 1),
(0, 2), (1, 2), (2, 2), . . . , (a.W−1, 2),
. . . ,
(0, a.H−2), (1, a.H−2), (2, a.H−2), . . . , (a.W−1, a.H−2),
(0, a.H−1), (1, a.H−1), (2, a.H−1), . . . , (a.W−1, a.H−1).

Furthermore, a pixel value of a pixel contained in the image a at coordinates (x, y) is denoted by a[x, y].

Each pixel value is expressed by a scalar value in the case of a monochrome image and by a red, green, and blue three-dimensional vector in the case of a color image. In this embodiment, digital expression is used. For example, the pixel values are integers ranging from 0 to 255 in the case of an eight-bit monochrome image. The three, red, green, and blue, pixel values are each an integer ranging from 0 to 255 in the case of a 24-bit color image.

The absolute value of the difference between the scalar values of the pixel values can be used as the distance between two pixel values in the case of a monochrome image. In the case of a color image, the distance between the vectors of the pixel values (the square root of the square sum of the differences of red, green, and blue elements), the square distance (the square sum of the differences of red, green, and blue elements), or the Manhattan distance (the total of the absolute values of the differences of the red, green, and blue) can be used.

Furthermore, a scheme using monochrome images converted from color images can be used for the distance between the pixel values of two pixels contained in the color images. In other words, the absolute value of the difference in a pixel value (scalar value) between two monochrome images converted from two color images is used as the distance between the pixel values of the two color images.

In the following explanation, the distance between two pixel values p and q is denoted by |p−q|.

In this embodiment, each of the pixels contained in an image is scanned. In other words, the pixels contained in an image are arranged into a line.

As described above, the image a has a total of a.W×a.H pixels. Then, the coordinates of a pixel i (i=0, 1, 2, . . . , a.W×a.H−1) after the pixels are arranged into a line can be obtained by various scanning schemes as described below.

Figure 1B:
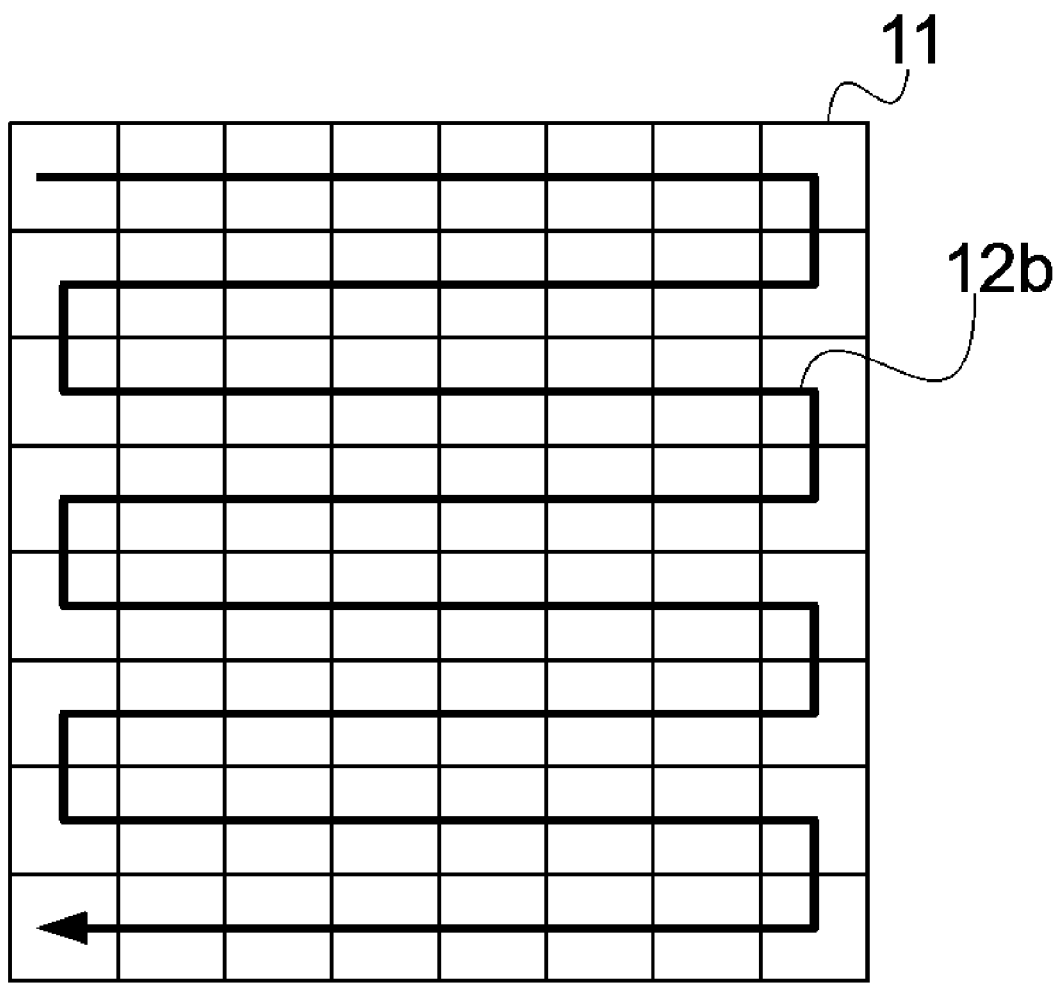
FIG. 1B is an explanatory illustration for explaining an image-scanning path.
Figure 1C:
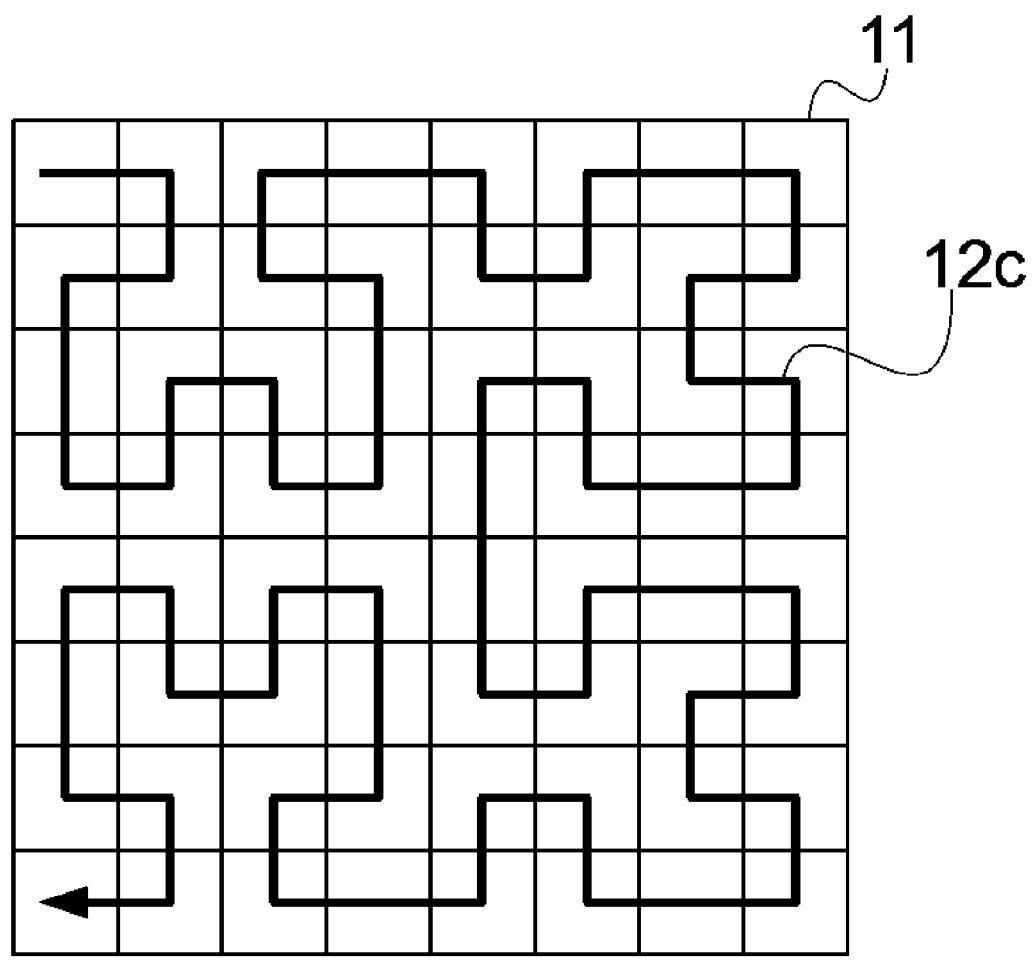
FIG. 1C is an explanatory illustration for explaining an image-scanning path.

FIGS. 1A, 1B, and 1C are explanatory illustrations for explaining pixel-scanning paths. The following explanation will be made with reference to these figures. In these figures, an image 11 consisting of 8×8 pixels is scanned along a path 12a, 12b, or 12c.

The first scheme yields the coordinates (i mod a.W, i div a.W) for a pixel i of the image a. Here, x div y means integer division (the result of dividing x by y) and x mod y means the reminder from the integer division (the remainder as a result of dividing x by y). As shown in FIG. 1A, this scheme scans each of the pixels of the image 11 along the path 12a. In other words, first, the pixels are scanned horizontally from the left end to the right end. Reaching the right end, downward shift by one dot is made and then the pixels are scanned horizontally from the left end to the right end. This process is repeated.

With the second scheme, the coordinates of a pixel i of the image a is:

(a) (i mod a.W, i div a.W) when i div (a.W×2) is an even number, and (b) (a.W−(i mod a.W)−1, i div a.W) when i div (a.W×2) is an odd number.

As shown in FIG. 1B, this scheme scans each of the pixels of the image 11 along the path 12a. In other words, first, the pixels are scanned horizontally from the left end to the right end. Reaching the right end, downward shift by one dot is made and then the pixels are scanned from the right end to the left end. Reaching the left end, downward shift by one dot is made and then the pixels are scanned from the left end to the right end. This process is repeated.

The third scheme utilizes the pseudo-Hilbert scan as disclosed in the Non Patent Literature 1. With the second scheme, the pixels adjoining each other in the vertical direction in the image are separated upon scanning. With this scheme, as shown in FIG. 1C, the pixels adjoining each other in the horizontal or vertical direction in the image 11 are more likely and frequently to be proximate on the scan path 12c than in the case of FIG. 1B.

In the following explanation, the pixel value of an pixel i on a path 12 of scanning the image 11 is denoted by a(i) for easier understanding.

A series of pixel values a(0), a(1), a(2), . . . , a(a.W×a.H−1) obtained by scanning corresponds to the following pixel values in a different order.

a[0, 0], a[1, 0], a[2, 0], . . . a[a.W−1, 0],
a[0, 1], a[1, 1], a[2, 1], . . . a[a.W−1, 1],
a[0, 2], a[1, 2], a[2, 2], . . . a[a.W−1, 2],
. . . ,
a[0, a.H−2], a[1, a.H−2], a[2, a.H−2], . . . a[a.W−1, a.H−2],
a[0, a.H−1], a[1, a.H−1], a[2, a.H−1], . . . a[a.W−1, a.H−1].

(Image Evaluation Device)

Figure 2:
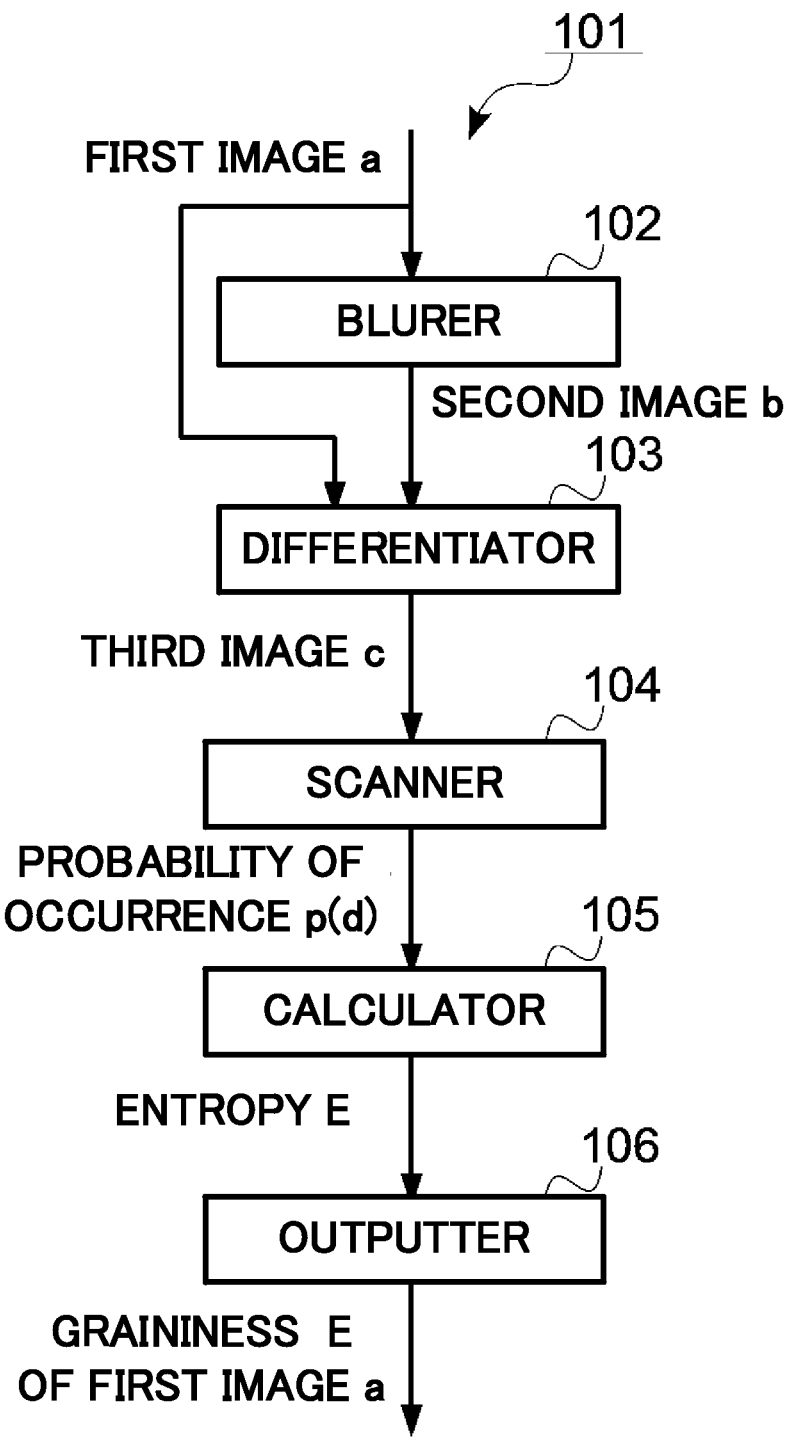
FIG. 2 is an explanatory illustration showing the general configuration of the image evaluation device according to the embodiment.
Figure 3:
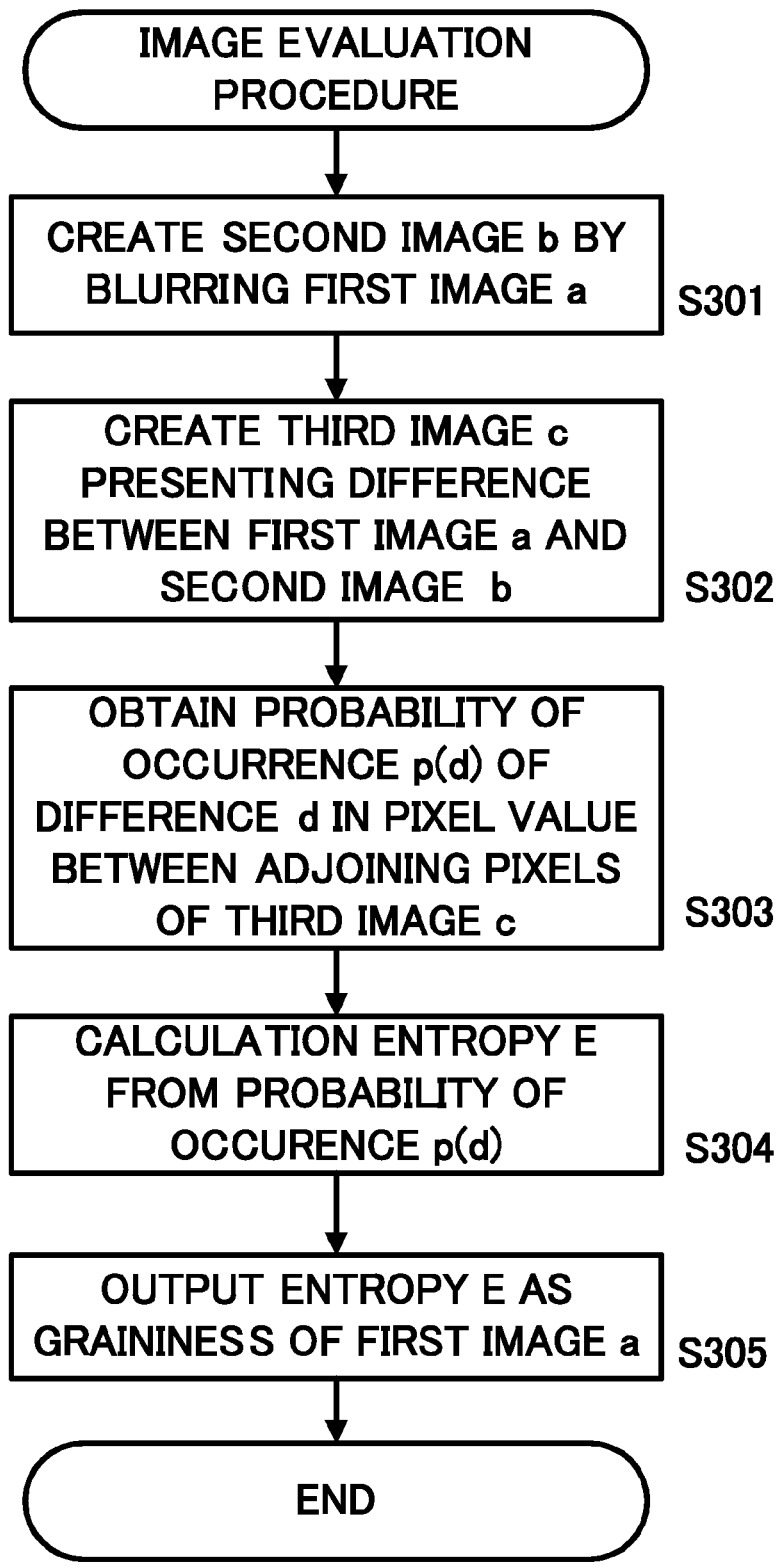
FIG. 3 is a flowchart showing the control flow in the image evaluation procedure executed by the image evaluation device according to the embodiment.

FIG. 2 is an explanatory illustration showing the general configuration of the image evaluation device according to this embodiment. FIG. 3 is a flowchart showing the control flow in the image evaluation procedure executed by the image evaluation device. The following explanation will be made with reference to these figures.

An image evaluation device 101 according to this embodiment comprises, as shown in FIG. 2, a blurer 102, a differentiator 103, a scanner 104, a calculator 105, and an outputter 106. The functions of these components are realized as a computer executes given programs.

The following explanation will be made on the assumption that the image evaluation device 101 evaluates a first image a. Furthermore, it is assumed that one of the above-described different scanning paths is selected and applied to all images to be processed.

Here, information on the first image a and all images to be processed as described later is recorded on a recording medium such as a hard disc, transmitted/received or distributed via a computer communication network, or stored in a temporary storage region of a RAM or the like in order to carry out various kinds of processing.

First, the blurer 102 blurs the first image a to create a second image b in the image evaluation device 101 (Step S301). Here, the blurring is realized by applying a so-called smoothing filter to the image.

Here, the first image a and second image b are equal in width and length.

In other words, a.W=b.W and a.H=b.H are satisfied.

Using the above-described scanning, a simple scheme of smoothing the pixels of the first image a can be as follows. For example, the average of adjoining pixels is obtained as follows for smoothing:

$$b(i) \leftarrow (a(i)+a(i+1))/2, (i=0,1,\ldots,a.W \times a.H-2); \text{ and}$$

$$b(i) \leftarrow a(i), (i=a.W \times a.H-1)$$

in which the symbol "←" means substituting.

Additionally, the weighted average of a pixel and the pixels immediately before and after it on the path is obtained as follow for smoothing:

$$b(i) \leftarrow a(i), (i=0);$$

$$b(i) \leftarrow (a(i-1)+B \times a(i)+a(i+1))/(B+2),$$
$$(i=1,2,\ldots,W \times a.H-2); \text{ and}$$

$$b(i) \leftarrow a(i), (i=a.W \times a.H-1)$$

in which B is a given positive constant.

Two-dimensional smoothing can also be used without using the above-described scanning schemes. For example, the weighted average of a pixel and the pixels immediately above and below it and on its right and left is obtained as follows for smoothing:

$$b[x,y] \leftarrow (a[x-1,y]+a[x+1,y]+a[x,y-1]+a[x,y+1]+B \times b[x,y])/(B+4), (x=1,2,\ldots,a.W-2; y=1, 2,\ldots,a.H-2); \text{ and}$$

$$b[x,y] \leftarrow a[x,y], (x=0 \text{ or } x=a.W-1 \text{ or } y=0 \text{ or } y=a.H-1)$$

in which x and y are integers.

Various other blurring schemes and/or image-smoothing filters are applicable to the blurring of this step.

Here, in order to obtain the pixel value of the pixel at a desired position in the second image b, the above-described schemes make reference to the pixel value of the pixel at the desired position in the first image a and additionally make reference to the pixel values around the desired position for obtaining the average. Therefore, different approaches are taken for obtaining the average depending on whether the surroundings around a desired position are all within the first image a or some of them are outside the first image a.

For example, the simplest scheme among the above-described schemes obtains the average between the pixel value at a desired position and the pixel value at the next position for blurring.

Therefore, if the desired position is situated at the last pixel of the second image b, the next position is outside the first image a. Then, in such a case, the pixel value of the pixel at the last position of the first image a is used as it is. This applies to the two other schemes.

Figure 4A:
FIG. 4A is an explanatory illustration presenting the profile of pixel values obtained by scanning a first image a that is a rough image depicting an object.

FIG. 4A is an explanatory illustration presenting the profile of pixel values obtained by scanning the first image a that is a rough image depicting the object.

Figure 4B:
FIG. 4B is an explanatory illustration presenting the profile of pixel values obtained by scanning a first image a that is a smooth image depicting an object.

FIG. 4B is an explanatory illustration presenting the profile of pixel values obtained by scanning the first image a that is a smooth image depicting an object.

Figure 5A:
FIG. 5A is an explanatory illustration presenting the profile of pixel values obtained by scanning a second image b corresponding to the first image a shown in FIG. 4A.

FIG. 5A is an explanatory illustration presenting the profile of pixel values obtained by scanning the second image b corresponding to the first image a shown in FIG. 4A.

Figure 5B:
FIG. 5B is an explanatory illustration presenting the profile of pixel values obtained by scanning a second image b corresponding to the first image a shown in FIG. 4B.

FIG. 5B is an explanatory illustration presenting the profile of pixel values obtained by scanning the second image b corresponding to the first image a shown in FIG. 4B.

The following explanation will be made with reference to these figures.

The horizontal axis of FIGS. 4A, 4B, 5A and 5B presents the order on the scanning path and the vertical axis thereof presents the pixel values of pixels in this order. In these figures, the pixel values are scalar values.

In the image shown in FIG. 4B, the pixel values of the first image a change fairly smoothly.

On the other hand, in the image shown in FIG. 4A, the pixel values of the first image a change fairly smoothly except for some occasional, protruding peaks and receded bottoms.

Those correspond to noise upon photographing the image. A higher level of graininess (or roughness) and lower image quality can be assumed as more noise is observed.

FIG. 5A presents the pixel values of the second image b obtained by smoothing the rough first image a according to FIG. 4A and FIG. 5B presents the pixel values of the second image b obtained by smoothing the smooth first image a according to FIG. 4B.

The pixel values in FIGS. 5A and 5B change similarly to each other. This is because the peaks and bottoms are moderated by blurring.

Furthermore, the change in pixel value in FIGS. 5A and 5B is similar to the change in the first image a of FIGS. 4A and 4B as a whole.

The pixel values are added, subtracted, multiplied, and/or divided in the same calculation fashion as ordinary scalar values and vector values. However, if the elements are normalized to integer values, the first image a and second image b can be made equal in size.

Then, the differentiator 103 creates a third image c presenting the difference between the first image a and second image b (Step S302).

The difference between the first image a and second image b is expressed by the distance between the image values situated at the same position in the images. Here, the third image c is equal to the first image a and second image b in length and width:

$$a.W=b.W=c.W, a.H=b.H=c.H$$

The third image c can be created by scanning the pixels along the above-described paths and obtaining the pixel values of the third image c as follows:

$$c(i) \leftarrow |b(i)-a(i)|, (i=0,1,2,\ldots,a.W \times a.H-1).$$

However, the pixels can be manipulated based on another order. For example, the pixels can be manipulated along the rows or columns within the image as follows:

$$c[x,y] \leftarrow |b[x,y]-a[x,y]|, (x=0,1,\ldots,a.W-1; y=0, 1,\ldots,a.H-1)$$

Figure 6A:
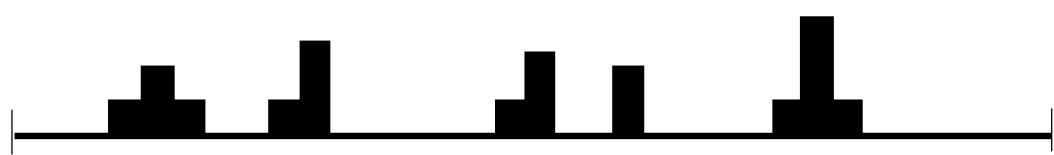
FIG. 6A is an explanatory illustration presenting the profile of pixel values of a third image c corresponding to the profile of pixel values of the first image a shown in FIG. 4A and to the profile of pixel values of the second image b shown in FIG. 5A.
Figure 6B:
FIG. 6B is an explanatory illustration presenting the profile of pixel values of a third image c corresponding to the profile of pixel values of the first image a shown in FIG. 4B and to the profile of pixel values of the second image b shown in FIG. 5B.

FIGS. 6A and 6B are explanatory illustrations presenting the profile of pixel values of the third image c corresponding to the profile of pixel values of the first image a shown in FIGS. 4A and 4B and to the profile of pixel values of the second image b shown in FIGS. 5A and 5B. The following explanation will be made with reference to these figures.

The third image c represented in FIG. 6B is created from the smooth first image a, in which almost no peaks and bottoms corresponding to the noise appear and the pixel values are equal or nearly equal to zero.

On the other hand, the third image c represented in FIG. 6A is created from the rough first image a, in which some protruding peaks and bottoms corresponding to the noise remain. However, the pixel values are equal or nearly equal to zero where there is no noise.

Then, the present invention utilizes entropy for employing the degree of protruding and remaining as the evaluation value.

To do so, the scanner 104 scans each of the pixels contained in the third image c and obtains the probability of occurrence of the difference in pixel value between adjoining pixels (Step S303).

Here again, the pixels can be scanned along the rows or columns as described above or along a path in sequence as described below. In order to obtain the probability of occurrence of the difference in pixel value, first, the frequency of each pixel value should be obtained. An array t is prepared for storing the frequency. The array t can be a one-dimensional array or an associative array. The notation t[x] is used to access each element of the array t.

Here, if the array t is an ordinary one-dimensional array, the number of elements can be set to the possible maximum value DMAX of the distance between pixel values plus one.

For example, when the first image a and second image b are eight-bit monochrome images, each pixel value is in a range from 0 to 255. If the absolute value of the difference in pixel value is used as the distance, each element of the third image c is in a range from 0 to 255, which means an eight-bit monochrome image; then, DMAX=255.

When the first image a and second image b are 24-bit color images and the square sum of the differences in pixel value of the elements is used as the distance, DMAX=255×255×3=195075.

In order to obtain the frequency, each of the elements of the array t each must have an initial value of 0. Therefore, when the array t is a one-dimensional array, the following must be executed before counting the frequency:

$$t[d] \leftarrow 0, (d=0,1,\ldots,DMAX)$$

Additionally, the array t can be an associative array using the hash or the like. The difference in pixel value is mostly nearly equal to zero; therefore, use of the hash or the like allows for efficient memory use. In such a case, the default value of each of the elements of the array t is set to zero.

Here, each of the elements t[x] of the array t should be able to store the maximum value of the distance between pixel values.

When the first image a is an eight-bit monochrome image, the pixel values of the first, second, and third images a, b, and c are expressed by an integer value ranging from 0 to 255. Then, it is sufficient to allocate a one-byte region for each element of the array expressing those.

On the other hand, the image size can vary to a great extent. As for widely used image sizes, both the width and height can be expressed by a two-byte integer. Then, it is sufficient to allocate a four-byte region for each element of the array t.

The simplest method of obtaining the frequency consists of counting along a path as follows:

$$t[c(i)] \leftarrow t[c(i)]+1, (i=0,1,\ldots,a.W \times a.H-1)$$

Here, the third image c can be considered to be a one-dimensional array when it is scanned along a path and corresponds to be a two-dimensional array when it is viewed as an ordinary image. Therefore, various techniques of counting the distribution of the values of the elements of the array in parallel or concurrently are applicable.

Once the frequency of the pixel having a difference in pixel value of d in each element t[d] of the array t is obtained, the probability of occurrence p(d) of the difference d is calculated as follows:

$$p(d)=t[d]/(a.W \times a.H)$$

Then, the calculator 105 calculates an entropy E from the respective probabilities of occurrence p(d) of the differences obtained for each difference d (Step S304).

Here, the set of integer values appearing as the pixel values of the third image c (the differences in pixel value between the first image a and second image b) is denoted by keys (t). In other words, t[d]>0 when d∈keys (t) is satisfied, and t[d]=0 when d∈keys (t) is not satisfied:

$$keys(t)=\{d|d\in\{0,1,\ldots,DMAX\}, t[d]>0\}$$

Then, the entropy E can be calculated as follows:

$$E=-\Sigma_{d\in keys(t)}p(d)\times\log(p(d))$$

The calculation used in the Steps S301 to S303 can all be done with integers. However, floating decimal point calculation or fixed decimal point calculation is used for calculating the entropy because the calculation of the log (•) involves the natural logarithm or common logarithm.

Finally, the outputter 106 outputs the entropy E as the evaluation value of the graininess (or roughness) of the first image a (Step S305).

As described above, when the first image a is a rough image, peaks and bottoms appear in the pixel values. Then, many different non-zero pixel values appear in the third image c. Therefore, the entropy E calculated as described above is higher. Then, the entropy E can be used as an indicator of the graininess (or roughness) of an image.

The Patent Literature 1 compares an evaluation-target image with the original image to obtain the graininess (or roughness) of the evaluation-target image. On the other hand, this scheme obtains the graininess (or roughness) of an evaluation-target first image a only from the first image a.

In other words, this scheme can properly calculate the graininess (or roughness) of an evaluation-target image even if there is no original image to make reference to.

Here, the above-described scheme is nearly the same as the scheme of extracting the outline of an object depicted in an image. Then, the calculated entropy becomes higher as the object photographed in the first image has a complex shape.

However, the entropy components derived from the degree of complexity of an object shape are nearly at the same level in the comparison of graininess (or roughness) between two photographic images of the same object.

Furthermore, even in the case of images comprising different numbers of pixels, the entropy components derived from an object being depicted are at the same level as long as the object occupies each image at the same area ratio.

Therefore, the graininess (or roughness) can easily be compared between two images by comparing the entropy obtained from the two images as it is.

The above-described embodiment creates from the first image a the second image b that is a blurred image of the first image a and the third image c presenting the difference between the first image a and second image b, and counts the frequency of occurrence of each pixel value in the third image c. Therefore, high speed calculation is made possible by using a CPU or co-processor having multimedia calculation hardware blurring an image and obtaining the difference.

On the other hand, the pixel value c(i) is the distance between b(i) and a(i) and b(i) can be obtained from the pixel value of a pixel near an pixel i in the first image a. Therefore, it is possible to eliminate the image storage region for storing the second image b and third image c and reduce the memory usage by directly obtaining each c(i) from the necessary pixel value of a pixel in the first image a and updating the array t with the obtained value.

For comparing the quality between images of different sizes, the prior art schemes have to make the images equal in size. However, the above-described embodiment can compare the image graininess (or roughness) by scanning all pixels and blurring the image without directly dealing with the image size.

A scheme extensively used with the prior art two-dimensional blurring filters makes reference to the pixel values of neighboring pixels over D dots above, below, and to the right and left of a desired position, namely the pixel values of (2×D+1)×(2×D+1) pixels, to obtain the weighted average. Therefore, some filters make the outer borders of the second image b smaller than the first image a by D dots. Some filters change the range of region of an image within which the average is calculated so as not to change the outer borders of an image in width and height before and after blurring.

The latter two-dimensional blurring filter can be used with the above-described embodiment as it is. On the other hand, in order to use the former two-dimensional blurring filter with the above-described embodiment, one of the following schemes can be used:

(a) following the blurring, the outer borders of the first image a is removed by D dots at the top, bottom, right and left to make the first image a equal to the second image b in size; or (b) the pixels corresponding to D dots at the outer borders of the second image b are assumed to have the same pixel values as those of the first image a.

With the above scheme (a), the pixels corresponding to D dots at the outer borders are present in the first image a but absent in the second image b. Then, the above scheme (a) ignores the outer borders upon calculating the entropy.

On the other hand, the above scheme (b) treats the pixel values of pixels corresponding to D dots at the outer borders as being equal between the first image a and second image b.

Generally, the background is displayed and no important information is contained at the outer borders of an image in many cases. Furthermore, in the comparison between the number of pixels corresponding to D dots at the outer borders and the number of the other pixels, the latter is generally extremely great. Therefore, even if the above scheme (a) or (b) is used, a satisfactory result as an indicator for evaluating the graininess (or roughness) of an image can be obtained.

In the above-described embodiment, the pixel value of each pixel of the third image presents the difference in pixel value between the pixels at the same position in the first and second images. However, the positional correspondence can be changed on an arbitrary basis. In other words, the difference in pixel value at each position between the first and second images can be expressed by the pixel at the same position in the third image; however, it does not need to be the same position.

For example, the difference between the pixels at each position in the first and second images can be stored at the pixel in the third image at the mirror-image position or inverted position with respect to that position.

In any case, as a pixel position in the third image is given, the corresponding pixel position in the first and second images is determined.

Therefore, generally, the pixel value of each pixel in the third image presents the difference in pixel value between the pixels in the first and second images at the position corresponding to that pixel.

Embodiment 2

At an electronic shopping mall where multiple store owners exhibit the same product, the store owners prepare photographic or picture images of the product in many cases.

Those images include images prepared by the manufacturer of the product in advance, photographic images shot by store owners with digital cameras, and images modified by store owners with the addition of information such as a tagline, store logo, or price.

On the other hand, as a user of the electronic shopping mall searches for a product, images of the product are displayed on a list of search results in many cases. In such a case, it is sometimes desirable that the product and a store owner exhibiting the product are combined as one search result and a representative image of the product is presented to the user.

The image evaluation scheme according to the above-described embodiment can be used to properly select a representative image presenting the product when multiple images depicting the product have been prepared.

In other words, a less rough image presumably makes it easier for the user to view the product and induces the user to favor it.

Furthermore, in the case of the store owner doing some editing such as addition of a tagline, the image becomes rougher. Therefore, presumably, an image of a faithful copy of the actual product with no editing can easily be obtained among less rough images.

The image selection device according to this embodiment selects such an image. Here, the image selection device is applicable to select any image from multiple images for any purpose. For example, the image selection device is applicable to automatically select the best photographic image after the user successively photographed an object multiple times, or to select a frame image representing the video image among the frame images of the video image created by arranging multiple frame images in sequence.

The image selection device can be realized by a computer executing given programs like the above-described image evaluation device 101, or can be mounted as an electronic circuit using the FPGA or the like.

Figure 7:
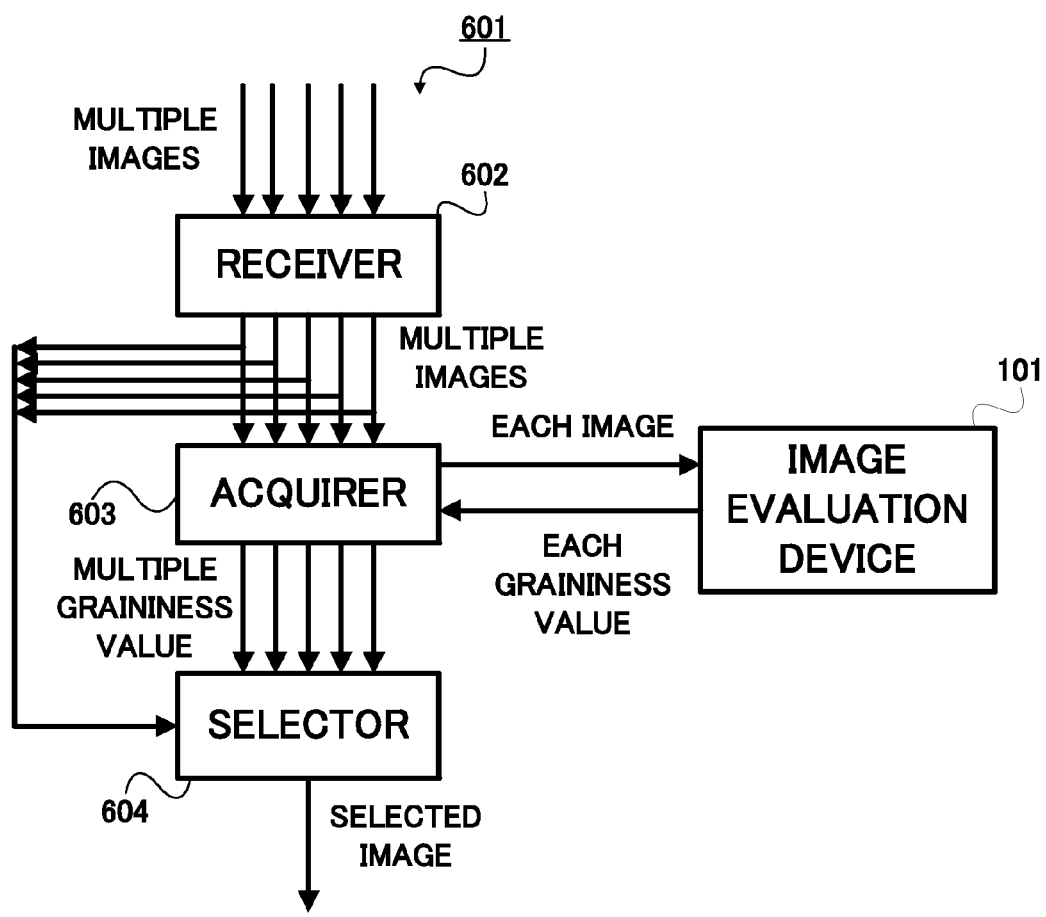
FIG. 7 is an explanatory illustration showing the general configuration of the image selection device according to the embodiment.

FIG. 7 is an explanatory illustration showing the general configuration of the image selection device according to this embodiment. FIG. 8 is a flowchart showing the process flow of the image selection method executed by the image selection device. The following explanation will be made with reference to these figures.

As shown in FIG. 7, an image selection device 601 comprises a receiver 602, an acquirer 603, and a selector 604.

When the image selection device 601 is realized by a computer executing given programs, first, the receiver 602 receives multiple images depicting a single target as the programs have started (Step S701).

Here, the multiple images are typically recorded on a hard disc. However, the multiple images can be acquired through computer communication networks in sequence.

Then, the acquirer 603 acquires the evaluation value of the graininess (or roughness) of each of the multiple received images from the above-described image evaluation device 101 (Step S702).

As described above, the above-described image evaluation device 101 can evaluate the graininess (or roughness) of each image independently without comparing with the original image or other images. Therefore, the graininess (or roughness) evaluation values can be calculated in parallel or concurrently.

Finally, the selector 604 selects the least rough image or an image with the lowest entropy from the multiple received images based on the acquired graininess (or roughness) evaluation values (Step S703), and the procedure ends.

As described above, the obtained graininess (or roughness) is the entropy of nonsmooth parts of the image. The entropy is increased when the image contains many noises or when the image has new information (for example, an image of a tag line character string) overwritten.

Therefore, selecting the least rough image results in selecting an image depicting the photographed target in an easily viewable and faithful manner as much as possible.

As described above, this embodiment makes it possible to properly select a representative image from multiple images with simple calculation.

This application claims the priority based on Japanese Patent Application No. 2012-100211, filed in Japan on Apr. 25, 2012, and the contents of the basic application are incorporated herein to the extent that the law of the designated country permits.

INDUSTRIAL APPLICABILITY

The present invention can provide an image evaluation device, image selection device, image evaluation method, recording medium, and program for properly evaluating the graininess (or roughness) of an image.

REFERENCE SIGNS LIST

101 Image evaluation device
102 Blurer
103 Differentiator
104 Scanner
105 Calculator
106 Outputter
601 Image selection device
602 Receiver
603 Acquirer
604 Selector

The invention claimed is:
1. An image evaluation device, comprising:
a blurer creating a second image by blurring a first image;
a differentiator creating a third image presenting a difference in pixel value of each pixel between the first image and the second image;
a scanner scanning pixels contained in the third image, obtaining differences in pixel value between adjoining pixels, and obtaining respective probabilities of occurrence of the obtained differences;
a calculator calculating an entropy from the respective probabilities of occurrence of the obtained differences; and
an outputter outputting the entropy as an evaluation value of a graininess of the first image.

2. The image evaluation device according to claim 1, wherein:
the scanner scans the pixels contained in the third image from left to right and from top to bottom.

3. The image evaluation device according to claim 1, wherein:
the scanner scans the pixels contained in the third image along a space-filling curve.

4. The image evaluation device according claim 1, wherein:
a pixel value of each pixel contained in the third image is a distance between a pixel value at the position of that pixel in the first image and a pixel value at the position of that pixel in the second image in a given color space.

5. The image evaluation device according to claim 1, wherein:
the difference in pixel value between the adjoining pixels is a distance between pixel values of the adjoining pixels in a given color space.

6. An image selection device, comprising:
a receiver receiving multiple images depicting an object;
an acquirer acquiring an evaluation value of a graininess of each of the multiple received images from the image evaluation device according to claim 1; and
a selector selecting the least rough image from the multiple received images based on the acquired graininess evaluation values.

7. An image evaluation method executed by an image evaluation device comprising a blurer, a differentiator, a scanner, a calculator, and an outputter, comprising:
a blurring step in which the blurer creates a second image by blurring a first image;
a differentiation step in which the differentiator creates a third image presenting a difference in pixel value of each pixel between the first image and the second image;
a scanning step in which the scanner scans pixels contained in the third image, obtains differences in pixel value between adjoining pixels, and obtains the respective probabilities of occurrence of the obtained differences;
a calculation step in which the calculator calculates an entropy from the respective probabilities of occurrence of the obtained differences; and
an output step in which the outputter outputs the entropy as an evaluation value of a graininess of the first image.

8. A non-transitory computer-readable recording medium on which a program is recorded that allows a computer to function as:
a blurer creating a second image by blurring a first image;
a differentiator creating a third image presenting a difference in pixel value of each pixel between the first image and the second image;
a scanner scanning pixels contained in the third image, obtaining differences in pixel value between adjoining pixels, and obtaining respective probabilities of occurrence of the obtained differences;
a calculator calculating an entropy from the respective probabilities of occurrence of the obtained differences; and
an outputter outputting the entropy as an evaluation value of a graininess of the first image.

* * * * *